United States Patent
Nagy et al.

(10) Patent No.: US 7,638,584 B2
(45) Date of Patent: Dec. 29, 2009

(54) OLEFIN POLYMERIZATION PROCESS

(75) Inventors: Sandor Nagy, Naperville, IL (US);
Barbara M. Tsuie, Cincinnati, OH (US); Ronald J. Clemons, Fairfield, OH (US)

(73) Assignee: Equistar Chemicals, LP, Houston, TX (US)

( * ) Notice: Subject to any disclaimer, the term of this patent is extended or adjusted under 35 U.S.C. 154(b) by 647 days.

(21) Appl. No.: 11/471,685

(22) Filed: Jun. 20, 2006

(65) Prior Publication Data

US 2007/0293639 A1    Dec. 20, 2007

(51) Int. Cl.
*C08F 4/643* (2006.01)
*C08F 4/653* (2006.01)
*C08F 4/6592* (2006.01)

(52) U.S. Cl. .................... 526/116; 526/114; 526/124.2; 526/160; 526/161; 526/165; 526/943; 502/113; 502/152; 502/155

(58) Field of Classification Search ................. 526/114, 526/116, 124.2, 161, 943, 160, 165; 502/113, 502/152, 155
See application file for complete search history.

(56) References Cited

U.S. PATENT DOCUMENTS

| | | | |
|---|---|---|---|
| 4,701,432 A | 10/1987 | Welborn, Jr. ................ 502/113 |
| 6,211,311 B1 | 4/2001 | Wang et al. .................. 526/131 |
| 6,232,260 B1 | 5/2001 | Nagy et al. .................. 502/155 |
| 6,451,724 B1 | 9/2002 | Nifant'ev et al. ............ 502/103 |
| 6,559,251 B1 | 5/2003 | Wang et al. .................. 526/127 |
| 6,794,468 B1 | 9/2004 | Wang .......................... 526/161 |
| 6,838,410 B2 | 1/2005 | Wang et al. .................. 502/103 |
| 6,908,972 B2 | 6/2005 | Tsuie et al. .................. 526/160 |

FOREIGN PATENT DOCUMENTS

WO    WO 99/24446    5/1999
WO    WO 01/53360    7/2001

OTHER PUBLICATIONS

B. Zhu et al., *J. Appl. Polym. Sci.* 94 (2004) 2451.
S. Jüngling et al., *J. Organometal. Chem.* 460 (1993) 191.
S. Noh et al., *J. Organometal. Chem.* 518 (1996) 1.
S. Noh et al., *J. Organometal. Chem.* 580 (1999) 90.

*Primary Examiner*—Caixia Lu
(74) *Attorney, Agent, or Firm*—John Tyrell; Jonathan L. Schuchardt

(57) ABSTRACT

A process for polymerizing ethylene is disclosed. The process comprises polymerizing ethylene in the presence of a catalyst system which comprises a bridged indenoindolyl transition metal complex on a support material, an alkylalumoxane, a titanium tetralkoxide, and a branched alkyl aluminum compound. The process provides polyethylenes with low density from ethylene alone.

20 Claims, No Drawings

OLEFIN POLYMERIZATION PROCESS

FIELD OF THE INVENTION

This invention relates to a process for polymerizing ethylene in the presence of a mixed catalyst system. The process gives ethylene polymers with decreased density.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. To improve polymer properties, single-site catalysts, in particular metallocenes are beginning to replace Ziegler-Natta catalysts.

Catalyst precursors that incorporate a transition metal and an indenoindolyl ligand are known. U.S. Pat. Nos. 6,232,260 and 6,451,724 disclose the use of transition metal catalysts based upon indenoindolyl ligands.

U.S. Pat. No. 6,559,251 discloses a process for polymerizing olefins with a silica-supported, indenoindolyl Group 4-6 transition metal complex having "open architecture." WO 01/53360 discloses similar open architecture indenoindolyl catalysts that may be supported on an inert support. U.S. Pat. No. 6,211,311 teaches that many heterometallocenes are inherently unstable and this causes difficulties in supporting these catalysts and poor catalyst activity. This problem is avoided by using chemically treated supports to prepare supported catalysts containing heteroatomic ligands.

U.S. Pat. No. 6,908,972 discloses a process for polymerizing ethylene in the presence of a silica supported Group 3-10 transition metal catalyst that has two bridged indenoindolyl ligands. The catalyst is effective for copolymerizing ethylene with α-olefins such as 1-butene or 1-hexene to make low density polyolefins.

Mixed catalysts are known. For example, U.S. Pat. No. 4,701,432 codeposits two catalysts—a metallocene catalyst and a non-metallocene Ziegler-Natta transition metal compound—on a support and uses the mixed catalyst system to polymerize ethylene. Indenoindolyl transition metal complexes are not used. While titanium alkoxides fall within the broad disclosure of possible non-metallocene compounds, each of the examples uses a halogenated titanium compound such as titanium tetrachloride or di-(n-butoxy)titanium dichloride. Similarly, the reference discloses that organic compounds of lithium, calcium, zinc, and aluminum can be combined with the catalyst component, and many alkyl aluminum compounds are listed including some branched alkyl aluminum compounds. However, no preference is given for branched alkyl aluminum compounds. The examples all use a combination of methylalumoxane and trimethylaluminum. Nothing indicates that the mixed catalysts give polyolefins having decreased density. The examples in which ethylene alone is polymerized provide polyethylene with a density of 0.960 g/cm$^3$. Lower densities are only obtained when 1-butene is used as a comonomer.

Mixed catalysts are used to give low density polyethylene in *J. Appl. Polym. Sci.* 94 (2004) 2451. Indenoindolyl transition metal complexes are not used. No branched alkyl aluminum compounds are used. Only a combination of methylalumoxane and triethylaluminum is used.

Despite the considerable work done with catalysts based upon indenoindolyl ligands, there is a need for improvement, especially with regard to making low density polyolefins. Copolymerization of ethylene with an α-olefin lowers density but adds to the cost because the α-olefin is normally more expensive and requires separate equipment. It would be desirable to make polyethylenes having low density from ethylene alone.

SUMMARY OF THE INVENTION

The invention is a process for polymerizing ethylene in the presence of a catalyst system. The catalyst system comprises a bridged indenoindolyl transition metal complex on a support material, an alkylalumoxane, a titanium tetralkoxide, and a branched alkyl aluminum compound. The process enables production of polyethylene with decreased density from ethylene alone.

DETAILED DESCRIPTION OF THE INVENTION

The invention is a process for polymerizing ethylene in the presence of a catalyst system. The catalyst system comprises a bridged indenoindolyl transition metal complex on a support material, an alkylalumoxane, a titanium tetralkoxide, and a branched alkyl aluminum compound. The catalyst system provides a dual purpose, serving to both convert ethylene to 1-butene and to copolymerize ethylene with any generated 1-butene. The process gives polyethylene with decreased density.

Preferably, ethylene is polymerized without addition of a second olefin. Optionally, a second olefin can be added. Suitable olefins are $C_3$-$C_{20}$ α-olefins, such as propylene, 1-butene, 1-hexene and 1-octene, cyclic olefins such as cyclohexene and nonconjugated dienes such as ethylidene norbornene and mixtures thereof. Preferred olefins are 1-butene, 1-hexene, and 1-octene.

Optionally, hydrogen is used in the process to regulate polymer molecular weight. The amount of hydrogen needed depends upon the desired polyolefin molecular weight and flow properties. Generally, as the amount of hydrogen is increased, the polyolefin molecular weight decreases and the melt flow rate increases. For many applications, the polyolefin melt flow rate will be too low if the polymerization is performed in the absence of hydrogen.

The catalyst system comprises a bridged indenoindolyl transition metal complex on a support material, an alkylalumoxane, a titanium tetralkoxide, and a branched alkyl aluminum compound.

Suitable alkylalumoxanes include methylalumoxane (MAO), polymeric MAO (PMAO), ethylalumoxane, and isobutylalumoxane. Preferably, the alkylalumoxane is methylalumoxane.

The bridged indenoindolyl transition metal complex contains a Group 3 to 10 transition metal. Preferably the transition metal is a Group 3-5 transition metal, more preferably a Group 4 transition metal. Most preferably, the transition metal is zirconium or titanium.

The bridged transition metal complex incorporates an indenoindolyl ligand that is bonded to the transition metal. Suitable indenoindolyl ligands and ways to name, synthesize, and incorporate them into transition metal complexes have been described in considerable detail elsewhere; see, for example, U.S. Pat. Nos. 6,838,410, 6,794,468, and 6,232,260, the teachings of which are incorporated herein by reference. Suitable procedures for making the ligands and complexes also appear in PCT Int. Appls. WO 99/24446 and WO 01/53360.

The indolyl nitrogen of each indenoindolyl group is typically substituted with an alkyl, aryl, dialkylboryl, trialkylsilyl, or a divalent linking group.

The indenoindolyl ligand is bridged. By "bridged indenoindolyl ligand," we mean that the indenoindolyl group is joined to a second ligand by a divalent linking group. A wide variety of suitable linking groups are described in the art. The linking group can be a conjugated pi-electron system, but it need not be conjugated. Suitable divalent linking groups include dialkylsilyl, diarylsilyi, alkylboranyl, arylboranyl, alkylphosphinyl, arylphosphinyl, siloxy, polysiloxy, and hydrocarbyl groups. Preferred hydrocarbyl groups are alkylene, dialkylene, polyalkylene, arylene, diarylene, polyarylene, cycloalkyl, adamantyl, aralkylene, alkenyl, and alkynyl. Specific examples of suitable divalent linking groups are methylene, 1,2-ethenyl, 1,2-ethynyl, isopropylidene, 1,4-phenylene, α,α'-xylyl, 4,4'-biphenylene, 1,3-adamantyl, 1,4-adamantyl, phenylboranyl, methylboranyl, dimethylsilyl, diphenylsilyl, bis(dimethylsilyl), oxybis(dimethylsilyl), and the like. These and other divalent linking groups are described in the background references. (For some examples, see *J. Organometal. Chem.* 460 (1993) 191; 518 (1996) 1; 580 (1999) 90.)

The divalent linking group can link the indenoindolyl ligand to a polymerization-stable ligand. Suitable polymerization-stable ligands include cyclopentadienyl, indenyl, fluorenyl, boraaryl, indenoindolyl, and the like.

Preferred bridged indenoindolyl ligands have a structure selected from the group consisting of:

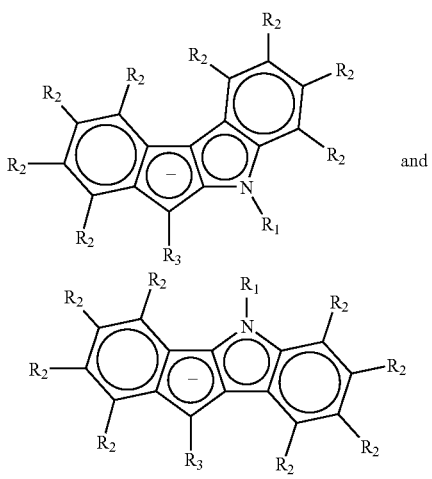

and in which $R_1$ is selected from the group consisting of $C_1$-$C_{30}$ hydrocarbyl, dialkylboryl, and trialkylsilyl; each $R_2$ is independently selected from the group consisting of $C_1$-$C_{30}$ hydrocarbyl, H, F, Cl and Br; $R_3$ is selected from the group consisting of divalent radicals connected to a second ligand wherein the divalent radical is selected from the group consisting of hydrocarbyl and heteroatom containing alkylene radicals, diorganosilyl radicals, diorganogermanium radicals, organoboranyl radicals, organophosphinyl radicals, and diorganotin radicals.

Additionally, the complex includes ancillary ligands that are bonded to the metal and satisfy the valence of the metal. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, and benzyl).

Bridged indenoindolyl ligands also include those used in open architecture complexes. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indolyl nitrogen or the indenyl methylene carbon. Preferably, the metal is sigma-bonded to a heteroatom, i.e., oxygen, nitrogen, phosphorus, or sulfur; most preferably, the metal is sigma-bonded to nitrogen. The heteroatom is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to either the indolyl nitrogen atom or the indenyl methylene carbon.

In a preferred process of the invention, the bridged indenoindolyl complex has the general structure:

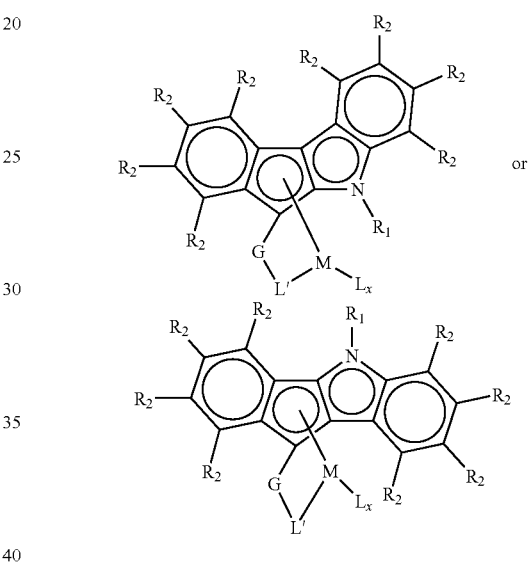

wherein M is a Group 3 to 10 transition metal; each L is independently selected from the group consisting of halide, alkoxy, aryloxy, siloxy, alkylamino, and $C_1$-$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_1$ is selected from the group consisting of $C_1$-$C_{30}$ hydrocarbyl, dialkylboryl and trialkylsilyl; each $R_2$ is independently selected from the group consisting of $C_1$-$C_{30}$ hydrocarbyl, H, F, Cl and Br; G is a divalent radical is selected from the group consisting of hydrocarbyl and heteroatom-containing alkylene radicals, diorganosilyl radicals, diorganogermanium radicals, oranoboranyl radicals, organophosphinyl radicals, and diorganotin radicals.

The complexes can be made by any suitable method; those skilled in the art will recognize a variety of acceptable synthetic strategies. Often, the synthesis begins with preparation of the desired indenoindole compound from particular indanone and arylhydrazine precursors. Treatment with base gives a ligand precursor. The indenoindole is linked with a second polymerization-stable ligand to give a linked ligand precursor. The final step normally involves reaction of the ligand precursor with a transition metal source to give the organometallic complex. The exact synthetic steps and the sequence used will normally depend upon the other ligands used and the transition metal source.

The process uses a catalyst system comprised in part of a bridged indenoindolyl complex and a support material. The support material is preferably porous. It can be, for example, an inorganic oxide, an inorganic chloride, or an organic polymer resin. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Most preferred is silica. The silica is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. The amount of indenoindolyl complex added is preferably from 0.01 to 0.5 mmol per gram of support material.

The alkylalumoxane can be added directly to the polymerization reactor before or after adding the supported indenoindolyl complex. In other words, a supported complex—without the alkylalumoxane—can be prepared first. In one preferred process, a solution of the indenoindolyl complex is combined with the support material. The mixture is stirred in an inert atmosphere at a temperature of from about 0° C. to about 120° C., more preferably from about 20° C. to about 40° C. The optimum stirring time will vary somewhat, depending upon the amounts of solvent and support material, but should be long enough to ensure good mixing. Preferably, the stirring time is from about 2 minutes to about 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free flowing solid. This can be done at room temperature by applying a vacuum. In one preferred embodiment, an incipient wetness technique is used. A small amount of solvent is used to dissolve the complex and the solution is added to the support material. The mixture remains a free flowing solid without solvent removal. The mixture can be used as is or residual solvent may be removed.

In another preferred embodiment, a solution of the alkylalumoxane is added to the support material prior to the addition of the indenoindolyl complex. This solution can contain all or a portion of the alkylalumoxane to be used, but preferably, it contains all of the alkylalumoxane to be used. Any remaining alkylalumoxane is added to the reactor at the start of the polymerization.

Even more preferably, the indenoindolyl complex is premixed with a solution of some or all of the alkylalumoxane prior to addition to the support material. Preferably, the indenoindolyl complex and alkylalumoxane solution are premixed for a period of time between 1 minute and five hours.

The catalyst system also comprises a titanium tetralkoxide and a branched alkyl aluminum compound. Preferably, the titanium tetralkoxide derives from one or more $C_1$-$C_8$ alcohols. More preferably, the titanium tetralkoxide is titanium (IV) methoxide, titanium(IV) ethoxide, titanium(IV) propoxide, titanium(IV) isopropoxide, titanium(IV) butoxide, or titanium(IV) 2-ethylhexoxide.

A branched alkyl aluminum compound is used. Preferably, the branched alkyl aluminum compound has the formula $RAlX_2$ in which R is a branched $C_3$ to $C_8$ alkyl group and each X is independently selected from the group consisting of halide and linear or branched alkyl. Exemplary branched alkyl aluminum compounds include:

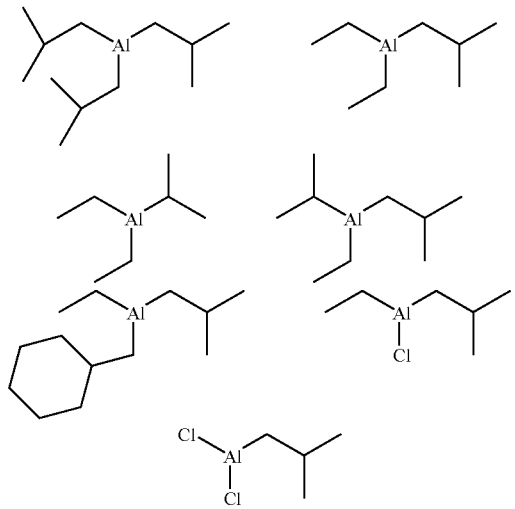

Preferably, the titanium tetralkoxide and branched alkyl aluminum compound are each added independently to the polymerization reactor. Optionally, they can be premixed and added together to the reactor. Branched alkyl aluminum compound concentrations used for the ethylene polymerization depend on many factors. Preferably, however, the concentration ranges from a molar ratio of branched alkyl aluminum compound to titanium tetralkoxide from 1000:1 to 0.5:1, more preferably from 500:1 to 1:1, and most preferably from 200:1 to 1.5:1.

A wide variety of olefin polymerization processes can be used. Preferred processes are slurry, bulk, solution, and gas-phase processes. A slurry or gas-phase process is preferably used.

The polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 0.1 MPa to about 350 MPa. More preferred is the range from about 0.1 MPa to about 7 MPa.

Catalyst concentrations used for the olefin polymerization depend on many factors. Preferably, however, the concentration ranges from about 0.01 micromoles transition metal per liter to about 100 micromoles per liter. Polymerization times depend on the type of process, the catalyst concentration, and other factors. Generally, polymerizations are complete within several seconds to several hours.

The molar ratio of titanium tetralkoxide to indenoindolyl complex can be varied. Generally, increasing levels of titanium tetralkoxide decreases the density of the polyolefin. Preferably, the molar ratio of titanium tetralkoxide to indenoindolyl complex is from 10:1 to 0.1:1, more preferably from 5:1 to 0.5:1.

An advantage of the process of the invention is the ability to make, from ethylene alone, polyethylene having a low density and substantial branching. Preferably, the resulting polyethylene has a density less than about 0.94 g/cm$^3$, more preferably less than 0.91 g/cm$^3$. Additionally, the polyethylene preferably has more than 10, and more preferably more than 30, ethyl branches per 1000 carbons as measured by $^{13}$C NMR spectroscopy. As Example 2 shows, no comonomer is needed for making polyethylenes having densities below 0.91 g/cm$^3$ and far more than 30 ethyl branches per 1000 carbons.

The following examples merely illustrate the invention. Those skilled in the art will recognize many variations that are within the spirit of the invention and scope of the claims.

EXAMPLE 1

Preparation of 6,6'-Methylene-bis(2,5-dimethyl-5,6-dihydroindeno[2,1-b]indol-6-yl)zirconium dichloride (1-4)

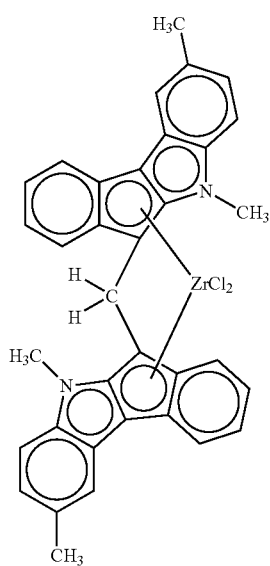

1-4

(a) Preparation of 2-methyl-5,6-dihydroindeno[2,1-b]indole (1-1) A 1-L, 3-neck flask equipped with mechanical stirrer, reflux condenser, and glass stopper is charged with 2-indanone (51.0 g, 0.39 mol) and p-tolylhydrazine hydrochloride (61.4 g, 0.39 mol). Glacial acetic acid (525 mL) is added at room temperature, and the mixture is vigorously stirred and heated to reflux. The mixture turns red, is heated for 2 hours, cools to room temperature, and is poured into ice water (1 L). The precipitate is filtered to afford a solid, which is washed with water (about 1 L). The solid is dissolved in ethyl acetate (1.4 L), activated charcoal is added and the mixture is gently warmed. The mixture is cooled and filtered over a pad of Celite. The filtrate is dried over Na$_2$SO$_4$, filtered, concentrated to 450 mL, and cooled to −30° C. for 3 days. The crystalline solid is filtered and washed with chilled (−78° C.) hexanes (2×500 mL), and the beige solid is collected and dried under vacuum (47.1 g, 55.6%). $^1$H NMR (CD$_2$Cl$_2$): 8.31 (br s, 1H, N—H), 7.65-7.63 (m, aromatic), 7.44-7.41 (m, aromatic), 7.35-7.33 (m, aromatic), 7.29 (m, aromatic), 7.08-7.01 (m, aromatic); total aromatic H=8, 3.75 (s, 2H, CH$_2$), 2.50 (s, 3H, ring CH$_3$).

(b) Preparation of 2,5-dimethyl-5,6-dihydroindeno[2,1-b]indole (1-2) A 500-mL, 3-neck flask equipped with mechanical stirrer, dropping additional funnel, and reflux condenser is charged with a solution of NaOH (42 mL, 21.5 M, 903 mmol) followed by C$_{16}$H$_{33}$NMe$_3$Br (0.36 g, 0.97 mmol). The product from step 1-1 (15.0 g, 68.4 mmol) is added under vigorous stirring followed by toluene (50 mL). A solution of methyl iodide (8.0 mL, 129 mmol) in toluene (15 mL) is added dropwise at room temperature, and the mixture is stirred at room temperature for 2.5 hours and at reflux for an hour. The mixture turns red and is cooled to room temperature and filtered. The crystalline solid is washed with chilled (−30° C.) ethanol (200 mL) followed by chilled hexanes (200 mL) to afford a pale red solid (10.3 g, 64.6%) $^1$H NMR (CD$_2$Cl$_2$): 7.62 (s, 1H, aromatic), 7.58 (d, J=7.2 Hz, 1H, aromatic), 7.43 (d, J=7.2 Hz, 1H, aromatic), 7.31 (t, J=7.0 Hz, 1H, aromatic), 7.27 (t, J=8.5 Hz, 1H, aromatic), 7.08-7.02 (m, 2H, aromatic), 3.80 (s, 3H, N—CH$_3$), 3.70 (s, 2H, CH$_2$), 2.50 (s, 3H, ring CH$_3$).

(c) Preparation of 6,6'-Methylene-bis(2,5-dimethyl-5,6-dihydroindeno[2,1-b]indole) (1-3) A slurry of 1-2 (9.32 g, 39.9 mmol) in degassed dimethylformamide (150 mL) is warmed to 70° C., and sodium ethoxide (1.37 g, 20.1 mmol) is added under nitrogen, and the solid dissolved to afford a dark orange solution. Formaldehyde (1.6 mL, 37 wt % in H$_2$O, 20.8 mmol) is added after an hour, and a precipitate forms after 20 min. Solid ammonium chloride (2.55 g, 47.7 mmol) is added, the mixture is filtered, and the solid is washed with dimethylformamide (50 mL) followed by diethyl ether (50 mL). The solid is dissolved in methylene chloride (1.3 L) and washed with water (1 L). The layers are separated, and the organics are dried over sodium sulfate and filtered. The volatiles are removed under reduced pressure, and the solid is dried under vacuum (4.12 g, 42.8%).

(d) Preparation of 6,6'-Methylene-bis(2,5-dimethyl-5,6-dihydroindeno[2,1-b]indol-6-yl)zirconium dichloride (1-4). A mixture of 1-3 (2.18 g, 4.55 mmol) in diethyl ether (80 mL) is cooled to −78° C., and n-butyllithium (4.0 mL, 2.5 M in hexanes, 10.0 mmol) is added by syringe. The cold bath is removed, and a yellow solid forms upon warming to 23° C. The volatiles are removed after 18 hours, and the solid is washed with diethyl ether (20 mL) and dried under vacuum (1.84 g, 82.5%). The dianion (1.84 g, 3.75 mmol) is added to a solution of zirconium tetrachloride (0.88 g, 3.77 mmol) in toluene (80 mL) and diethyl ether (30 mL) to afford a red mixture, which is stirred overnight, filtered, and dried under vacuum (2.57 g, 78.2%).

EXAMPLE 2

Polymerization

Silica (G3, available from Fuji Silysia Chemical Ltd.) is calcined at 200° C. for 16 hours. In a glove-box under nitrogen, the calcined silica (5.35 g) is slurried with 24 mL of dry toluene and 1.1 mL of a 30 wt. % solution of methylalumoxane (MAO) in toluene is added. The slurry is maintained for 80 minutes at room temperature and for 3 hours at 110° C. The slurry is cooled to room temperature and volatiles removed under vacuum to obtain 6.23 grams of treated silica. MAO (8.23 mL of a 30 wt % solution in toluene) is added to a solution of 125 mg of complex 1-4 in 20 mL of toluene. The solution is maintained at room temperature for 1 hour and added to a slurry of the treated silica in 35 mL of toluene. The mixture is kept for 3 hours at room temperature and volatiles are removed under vacuum. The solid is washed with hexanes (5×30 mL) and filtered to obtain 8.88 g of a pale grey-green solid. A 100-mg portion is added to one of four injector legs attached to a 2-L stainless steel polymerization reactor that has been pressure-purged with dry nitrogen three times at 70° C. After completely venting the reactor, 1 L of hexane is added, followed by 2.4 mL of triisobutylaluminum (1.0 M solution in hexanes). Ethylene is added to give a total reactor pressure of 0.9 MPa. Titanium(IV) butoxide (0.05 mL) is added through an injector leg. The 100 mg sample (complex 1-4 with MAO on silica) is added from another injector leg. Temperature is maintained at 70° C. and ethylene pressure is fed on demand to maintain 0.9 MPa. After 60 minutes of polymerization, the reactor is vented to remove the volatiles. The polyethylene (117 g) is removed from the reactor.

From the weight of the polyethylene, the calculated activity is 1,170 g polyethylene per g (complex 1-4 with MAO on silica) per hour. Density (by ASTM D-1505): 0.878 g/mL. Melting point (by differential scanning calorimetry, DSC): 119° C. Branching (by $^{13}$C NMR, confirmed by FTIR): 72 ethyl branches per 1000 carbons. $M_w$ (by gel permeation chromatography, GPC): 145 K; $M_w/M_n$: 7.3.

COMPARATIVE EXAMPLE 3

In similar fashion as Example 2, a polymerization is performed, substituting triethylaluminum for triisobutylaluminum. Activity: 510 g PE per g complex (1-4 with MAO on silica) per hour. Density: 0.910 g/mL. Mp (DSC): 119° C. $M_w$: 340 K; $M_w/M_n$: 8.4.

The density of the polyethylene prepared in Example 2 is much lower than that of the polyethylene from Comparative Example 3. This demonstrates the importance of using a branched alkyl aluminum compound and that the process of the invention is valuable for preparing polyethylene with decreased density. The activity in Example 2 is about double that obtained in Comparative Example 3, another unexpected advantage of using a branched alkyl aluminum compound in the process of the invention.

COMPARATIVE EXAMPLE 4

In similar fashion as Example 2, a polymerization is performed, substituting rac-ethylenebis(indenyl)zirconium dichloride (available from Sigma-Aldrich Corporation) for complex 1-4. Activity: 563 g PE per g (rac-ethylenebis(indenyl)zirconium dichloride with MAO on silica) per hour. Density: 0.945 g/mL. Mp (DSC): 127° C. Branching (by FTIR): 4.3 branches per 1000 carbons. $M_w$: 147 K; $M_w/M_n$: 4.4.

Example 2 and Comparative Example 4 show the importance of selecting a bridged indenoindolyl complex. Even with a branched alkylaluminum compound, the conventional bridged metallocene fails to provide polyethylene with the remarkably low density or high branching content observed with the bridged indenoindolyl complex. Moreover, the catalyst system of Example 2 is much more active than that used in Comparative Example 4.

COMPARATIVE EXAMPLE 5

In similar fashion as Comparative Example 3, a polymerization is performed, substituting rac-ethylenebis(indenyl)zirconium dichloride for complex 1-4. Activity: 538 g per g (rac-ethylenebis(indenyl)zirconium dichloride with MAO on silica) per hour. Density: 0.955 g/mL. Mp (DSC): 130° C. Branching (by FTIR): 1.6 branches per 1000 carbons. $M_w$: 64 K; $M_w/M_n$: 3.3.

Comparative Example 5 and Example 2 confirm the importance of selecting both a bridged indenoindolyl complex and a branched alkyl aluminum compound. With a linear alkyl aluminum compound and a conventional bridged metallocene, the catalyst system has lower activity and fails to provide polyethylene having low density and high branching content.

COMPARATIVE EXAMPLE 6

In similar fashion as Example 2, a polymerization is performed, without titanium(IV) butoxide. Activity: 964 g per g (complex 14 with MAO on silica) per hour. Density: 0.927 g/mL. Mp (DSC): 129° C. Branching: none detected. $M_w$: 565 K; $M_w/M_n$: 4.3.

Comparative Example 6 shows that without the titanium tetralkoxide, the desired lower density and substantial branching level are not achieved.

The preceding examples are meant only as illustrations. The following claims define the invention.

We claim:

1. A process which comprises polymerizing ethylene in the presence of a catalyst system which comprises a bridged indenoindolyl transition metal complex on a support material, an alkylalumoxane, a titanium tetralkoxide, and a branched alkyl aluminum compound.

2. The process of claim 1 wherein the support material is silica.

3. The process of claim 2 wherein the alkylalumoxane is combined with the silica prior to addition of the bridged indenoindolyl transition metal complex to the silica.

4. The process of claim 1 wherein the titanium tetraalkoxide derives from one or more $C_1$ to $C_8$ alcohols.

5. The process of claim 4 wherein the titanium tetralkoxide is selected from the group consisting of titanium(IV) methoxide, titanium(IV) ethoxide, titanium(IV) propoxide, titanium(IV) isopropoxide, titanium(IV) butoxide, and titanium (IV) 2-ethylhexoxide.

6. The process of claim 1 wherein the branched alkyl aluminum compound has the formula $RAIX_2$ in which R is a branched $C_3$ to $C_8$ alkyl group and each X is independently selected from the group consisting of halide and linear or branched alkyl.

7. The process of claim 6 wherein R is isobutyl.

8. The process of claim 7 wherein the branched alkyl aluminum compound is triisobutylaluminum.

9. The process of claim 1 wherein the bridged indenoindolyl complex has a structure selected from the group consisting of:

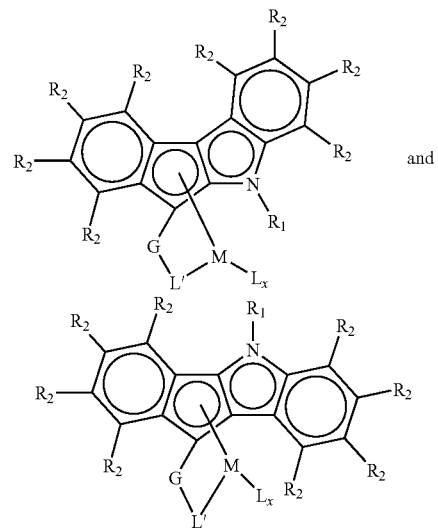

wherein M is a Group 3 to 10 transition metal; each L is independently selected from the group consisting of halide, alkoxy, aryloxy, siloxy, alkylamino, and $C_1$-$C_{30}$ hydrocarbyl; L' is selected from the group consisting of alkylamido, substituted or unsubstituted cyclopentadienyl, fluorenyl, indenyl, boraaryl, pyrrolyl, azaborolinyl and indenoindolyl; x satisfies the valence of M; $R_1$ is selected from the group consisting of $C_1$-$C_{30}$ hydrocarbyl, dialkylboryl and trialkylsilyl; each $R_2$ is independently selected from the group consisting of $C_1$-$C_{30}$ hydrocarbyl, H, F, Cl and Br; G is a divalent radical selected from the group consisting of hydrocarbyl and heteroatom-containing alkylene radicals, diorganosilyl radicals, diorganogermanium radicals, organoboranyl radicals, organophosphinyl radicals, and diorganotin radicals.

10. The process of claim 9 wherein L' is selected from the group consisting of substituted or unsubstituted cyclopentadienyl, fluorenyl, indenyl, and indenoindolyl.

11. The process of claim 1 wherein the alkylalumoxane is methylalumoxane.

12. The process of claim 1 comprising polymerizing ethylene in the presence of a second olefin.

13. The process of claim 1 performed at a temperature within the range of about 30° C. to about 100° C.

14. A slurry polymerization process of claim 1.

15. A gas-phase polymerization process of claim 1.

16. The process of claim 1 wherein the bridged indenoindolyl transition metal complex is supported on methylalumoxane-treated silica and the supported complex, the titanium tetraalkoxide, and the branched alkyl aluminum compound are each independently added to a polymerization reactor.

17. The process of claim 1 wherein the resulting polyethylene has a density less than 0.94 g/cm$^3$.

18. The process of claim 1 wherein the resulting polyethylene has a density less than 0.91 g/cm$^3$.

19. The process of claim 1 wherein the resulting polyethylene has, by $^{13}$C NMR spectroscopy, more than 10 ethyl branches per 1000 carbons.

20. The process of claim 1 wherein the resulting polyethylene has, by $^{13}$C NMR spectroscopy, more than 30 ethyl branches per 1000 carbons.

* * * * *